GRAIN CLEANING DEVICE
Filed Dec. 24, 1964
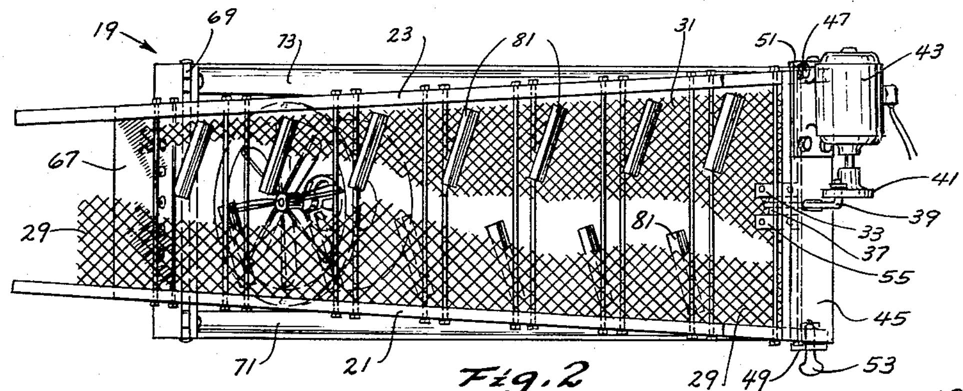
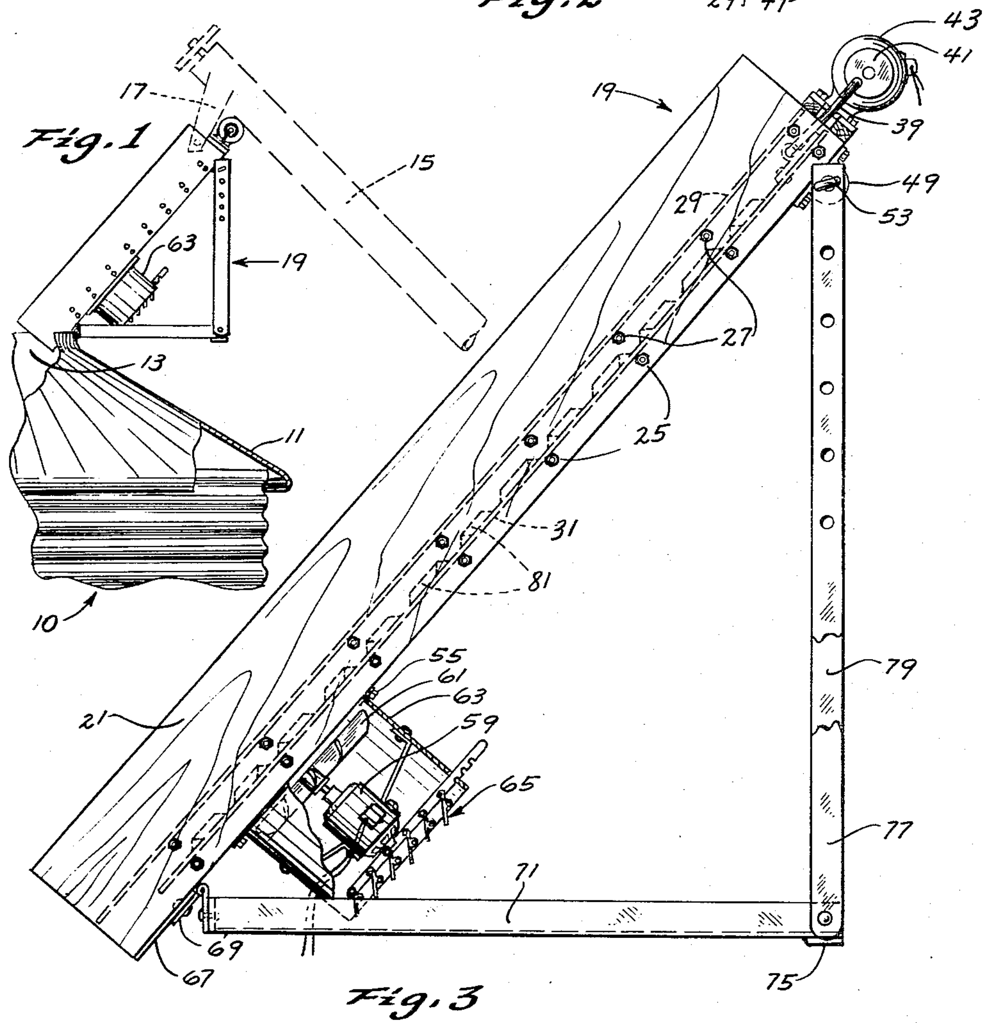
INVENTOR
EMIL G. GRULKE
BY Dick & Zarley
ATTORNEYS

United States Patent Office 3,370,705
Patented Feb. 27, 1968

3,370,705

GRAIN CLEANING DEVICE

Emil G. Grulke, Kelley, Iowa 50134

Filed Dec. 24, 1964, Ser. No. 421,162
1 Claim. (Cl. 209—240)

This invention relates to a grain cleaning device and more particularly to a grain cleaning device which is positioned between a conveyor means and a storage bin.

Shelled corn always contains a certain amount of "fines." These fines include minute particles of corn and small kernels. The presence of the fines in the corn result in the corn being of a somewhat lower grade. Additionally, the shelled corn usually contains husks, trash and cobs which also reduces the quality of the corn.

Therefore, it is a principal object of this invention to provide a grain cleaning device which is positioned between a conveyor means and a storage bin.

A further object of this invention is to provide a grain cleaning device which effectively separates a predetermined amount of fines from the remainder of the shelled corn.

A further object of this invention is to provide a grain cleaning device which removes husks, trash and cobs from the shelled corn.

A further object of this invention is to provide a grain cleaning device having a fan means operatively mounted thereon to blow a predetermined amount of husks, trash, cobs and fines from the shelled corn.

A further object of this invention is to provide a grain cleaning device which has a reciprocating screen means mounted therein.

A further object of this invention is to provide a grain cleaning device which may be selectively inclined.

A further object of this invention is to provide a grain cleaning device which may be readily and easily positioned between a conveyor means and a storage bin.

A still further object of this invention is to provide a grain cleaning device which is economical of manufacture, durable in use and refined in appearance.

These and other objects will be apparent to those skilled in the art.

This invention consists in the construction, arrangements, and combination of the various parts of the device, whereby the objects contemplated are attained as inafter more fully set forth, specifically pointed out in the claim, and illustrated in the accompanying drawings, in which:

FIG. 1 is a fragmentary side view of a storage bin and a conveyor means having the grain cleaning device positioned therebetween;

FIG. 2 is a top elevational view of the grain cleaning device with portions thereof cut away to more fully illustrate the invention; and FIG. 3 is a side view of the device with portions thereof cut away to more fully illustrate the invention.

The numeral 10 generally designates a granary having a roof 11 and a closable top opening 13 formed therein. The numeral 15 designates an auger or conveyor means having a discharge spout 17 secured to its upper end. The grain cleaner, which is the subject of this invention, is generally indicated at 19.

As seen in FIG. 2, grain cleaner 19 includes a pair of spaced apart, converging, vertical sideboards 21 and 23 which have a plurality of supporting rods 25 secured thereto by any convenient means and extending therebetween adjacent the lower edges thereof. Sideboards 21 and 23 also have a plurality of supporting rods 27 secured thereto and extending therebetween in a plane above rods 25.

A sheet of galvanized hardware cloth is positioned on top of rods 27 and extends between sideboards 21 and 23 as seen in the drawings. Hardware cloth 29 is secured to rods 27 in any convenient fashion. A sheet of galvanized hardware cloth 31 is movably positioned on top of rods 25 and extends between sideboards 21 and 23 as seen in the drawings.

Secured to the upper top surface of hardware cloth 31 is a pair of spaced apart bearing members 33 and 35 having a rotatable shaft 37 extending therebetween. An arm member 39 is rotatably connected to shaft 37 at its lower end and is operatively connected at its upper end to an eccentric cam means 41 which is driven by motor 43. Motor 43 is mounted on end member 45, which is secured to the upper ends of sideboards 21 and 23 and extends therebetween, by means of bolts 47.

As seen in FIGS. 2 and 3, ear members 49 and 51 are secured to the bottom sides of sideboards 21 and 23 adjacent their upper ends respectively, which extend downwardly therefrom and which are adapted to slidably receive pin 53.

As best seen in FIGS. 2 and 3, a shield member 63 is secured to sideboards 21 and 23 adjacent their lower ends by means of bolts 55. Mounted within shield member 63 is a motor 59 having a fan means 61 operatively rotatably secured thereto which is adapted to force air upwardly through hardware cloths 31 and 29. Secured to the lower end of shield member 63 is a louver means 65 to permit regulation of air that is supplied to fan means 61.

Secured to the bottom surfaces of sideboards 21 and 23 adjacent their lower ends by means of welding or the like is a plate 67 which extends therebetween. Bolted to plate 67 is one end of a hinge 69. The other end of hinge 69 is bolted at each of its lateral sides to angle members 71 and 73 extending rearwardly therefrom. A bar 75 is secured to the bottom rearward ends of angle members 71 and 73 by means of welding or the like and extends therebetween.

Pivotally connected to the rearward ends of angle members 71 and 73 by means of pin members are braces 77 and 79 respectively which extend upwardly therefrom. Braces 77 and 79 are provided with a plurality of holes along a portion of their lengths which are adapted to receive pin 53.

The upper surface of hardware cloth 31 is provided with a plurality of inverted V-shaped baffle members 81 extending inwardly and forward from its side as seen in FIG. 2.

The normal method of operation is as follows. The upper end of grain cleaner 19 is secured to the upper end of conveyor means 15 by any convenient means and the lower end of grain cleaner 19 is caused to extend downwardly into top opening 13. As seen in FIG. 1, the rim of top opening 13 engages grain cleaner 19 at a point below sideboards 21 and 23 forwardly of braces 71 and 73 to limit the downward movement thereof. Grain cleaner 19 would be positioned so that sideboards 21 and 23 slope at approximately 40 to 45 degrees. The slope of sideboards 21 and 23 may be adjusted by means of pin 53 and the holes in braces 77 and 79 as previously described. The drawings illustrate one means of adjusting the slope of the grain cleaner.

Conveyor means 15 deposits the grain on the upper end of hardware cloth 29. It has been found that a 3 x 3 hardware cloth is the most desirable cloth having 5⁄16 openings formed therein. The "fines" fall through hardware cloth 29 onto hardware cloth 31. Hardware cloth 31 is a 4 x 4 cloth having ¼ inch openings formed therein. Hardware cloth 31 permits some of the small particles of corn to fall downwardly therethrough onto the ground. Motor 43 shakes hardware cloth 31 at approximately 120 revolutions per minute. This shaking action causes a predetermined amount of the fines to fall downwardly through hardware cloth 31 onto the ground. The fines remaining on hardware cloth 31 are directed downwardly on hardware cloth 31 by means of baffles 81. Meanwhile, the cobs, husks and larger kernels of corn pass downwardly on screen 29. Fan means 61 forces air upwardly through hardware cloth 31 and 29 thereby blowing a predetermined amount of the remaining fines from hardware cloths 31 and 29 as well as blowing the undesirable husks and cobs from hardware cloth. Motor 59 should be a heavy duty motor which is moisture proof but yet light in weight. Fan means 61 should be able to deliver 4,000 cubic feet of air per minute at 1,750 revolutions per minute. Louver means 65 provides a means for regulating the supply of air to fan means 61.

Grain cleaner 19 separates approximately 60 percent of the undesirable fines before the grain passes over fan means 61. Fan means 61 blows approximately 60 percent of the remaining fines from hardware cloth 31 and hardware cloth 29.

As stated before, grain cleaner 19 is positioned so that hardware cloths 29 and 31 slope at approximately 40 to 45 degrees. This slope would be changed for variations in the moisture content of the grain to be cleaned. Preferably, the device should be constructed of a lightweight aluminum alloy.

The elimination of the undesirable fines, husks, cobs and trash from the grain reduces the length of time needed to dry the grain. The reduced drying time necessarily reduces the costs of such drying operations.

The elimination of the undesirable fines permits better and longer storage life of the grain and reduces the problem of insect infestation and damage.

Thus from the foregoing it can be seen that the device accomplishes at least all of its stated objectives.

Some changes may be made in the construction and arrangement of my Grain Cleaning Device without departing from the real spirit and purpose of my invention, and it is my intention to cover by my claim, any modified forms of structure or use of mechanical equivalents which may be reasonably included within their scope.

I claim:

1. In combination, a granary having a closable upper end, a conveyor means having its upper end positioned above said closable upper end, an inclined grain cleaning means having its upper end operatively secured to the upper end of said conveyor means and its lower end communicating with the interior of said closable upper end, said grain cleaning means including a screen means and a fan means forcing air upwardly through said screen means, said grain cleaning means also including a screen frame means having upper and lower ends, said screen frame means comprising a pair of elongated, spaced apart side boards and upper and lower end members extending between said side boards, said screen means comprising a top screen means secured to said side boards and extending therebetween along the length thereof and a bottom screen means below said top screen means extending between said side boards, said fan means positioned below said bottom screen means and forcing air through said bottom screen means and upwardly through said top screen means, said bottom screen means having means operatively connected thereto adapted to shake said bottom screen means, a first brace means pivotally secured at one end to said lower end member, an upstanding brace means secured at one of its ends to the other end of said first brace means and operatively detachably secured at its other end to said upper end member whereby the slope of said top and bottom screen means may be varied.

References Cited

UNITED STATES PATENTS

| | | | |
|---|---|---|---|
| 317,813 | 5/1885 | Lucas | 209—413 X |
| 337,370 | 3/1886 | Butler | 209—318 X |
| 1,431,987 | 10/1922 | Simpson | 209—413 X |
| 1,793,385 | 2/1931 | Boyer | 209—318 X |
| 2,254,576 | 9/1941 | Meals | 209—318 |
| 2,623,634 | 12/1952 | Kuss | 209—27 |
| 2,682,951 | 7/1954 | Hamburg | 209—261 |
| 2,732,941 | 1/1956 | Deiss | 209—261 |

FOREIGN PATENTS

| | | |
|---|---|---|
| 91,992 | 1/1896 | Germany. |
| 1,132,779 | 1/1962 | Germany. |
| 645,051 | 9/1962 | Italy. |

HARRY B. THORNTON, *Primary Examiner.*

R. HALPER, *Assistant Examiner.*